United States Patent
Perna et al.

(10) Patent No.: US 12,191,916 B2
(45) Date of Patent: Jan. 7, 2025

(54) METHOD FOR QUANTUM COMMUNICATION

(71) Applicant: Quantum Optics Jena GmbH, Jena (DE)

(72) Inventors: Adriá Sansa Perna, Jena (DE); Alessandro Zannotti, Jena (DE); Oliver de Vries, Jena (DE); René Heilmann, Schwansee (DE)

(73) Assignee: Quantum Optics Jena GmbH, Jena (DE)

( * ) Notice: Subject to any disclaimer, the term of this patent is extended or adjusted under 35 U.S.C. 154(b) by 285 days.

(21) Appl. No.: 17/945,175

(22) Filed: Sep. 15, 2022

(65) Prior Publication Data

US 2023/0090512 A1 Mar. 23, 2023

(30) Foreign Application Priority Data

Sep. 20, 2021 (DE) ...................... 10 2021 124 223.1

(51) Int. Cl.
*H04B 10/00* (2013.01)
*H04B 10/70* (2013.01)
*H04J 14/00* (2006.01)

(52) U.S. Cl.
CPC .................................. *H04B 10/70* (2013.01)

(58) Field of Classification Search
CPC ...................................................... H04B 10/70
See application file for complete search history.

(56) References Cited

U.S. PATENT DOCUMENTS

| 2011/0073783 | A1* | 3/2011 | Arahira | ................. | H04L 9/0858 250/493.1 |
| 2012/0002968 | A1* | 1/2012 | Luo | ....................... | H04L 9/0852 398/140 |
| 2014/0112478 | A1 | 4/2014 | Arahira | | |

FOREIGN PATENT DOCUMENTS

| CN | 113055098 | 6/2021 |
| CN | 113055098 A | 6/2021 |

OTHER PUBLICATIONS

European Search Report dated Feb. 13, 2023.
(Continued)

*Primary Examiner* — Daniel G Dobson
(74) *Attorney, Agent, or Firm* — Hoffmann & Baron, LLP

(57) ABSTRACT

A method for quantum communication between at least three receivers includes:
  i) generating an entangled photon pair in a source (2) with a signal photon in a signal wavelength range and an idler photon in an idler wavelength range,
  ii) assigning the signal and idler photons to the quantum channels (4) on the basis of their wavelength;
  iii) transmitting the photon pair to the receivers (3) via the quantum channels (4);
  iv) detecting the photon pair at the receivers (3).

The photons generated in step i) are generated in a signal wavelength range and an idler wavelength range that are spectrally separated from one another, and, in step ii), the photons are assigned to the quantum channels (4) such that, in step iii), only signal photons are transmitted to a first receiver (31) for the communication with all other receivers (3), and, in step iii), only idler photons are transmitted to a second receiver (32) for the communication with all other receivers (3), and, in step iii), both signal photons and idler photons are transmitted to the further receivers (33) for the (Continued)

communication with all other receivers (3), and all receivers (3) are connected to the source (2) via in each case one quantum channel (4).

15 Claims, 4 Drawing Sheets

(56) References Cited

OTHER PUBLICATIONS

Appas F et al: "Flexible entanglement-based secure communication with an AlGaAs chip for quantum networks", arxiv.org, Cornell University Library, 201 Olin Library Cornell University Ithaca, NY 14853, Feb. 9, 2021 (Feb. 9, 2021), XP081878211.
Wengerowsky Soren et al: "An entanglement-based wavelength-multiplexed quantum communication network", Nature, Nature Publishing Group UK, London, Bd. 564, Nr. 7735, Dec. 12, 2018 (Dec. 12, 2018), Seiten 225-228, XP036657342.

* cited by examiner

METHOD FOR QUANTUM COMMUNICATION

BACKGROUND OF THE INVENTION

The invention relates to a method for quantum communication between several receivers in a network according to the features of the preamble of claim 1 and a network system for quantum communication between several receivers.

Quantum communication enables the communication or the generation of a quantum key through the transmission or the exchange of single photons. For this, for example entangled photon pairs, which are generated in a source, are utilized, wherein in each case one photon per pair is subsequently transmitted to in each case one receiver in order to enable a communication or the generation of the key between these two receivers.

The transmission of the photons is effected in a network of quantum channels. Therein, either all receivers are connected directly to one another via in each case one quantum channel, or the connection of the receivers is effected via a source, which is connected to each receiver via one quantum channel in each case. A quantum channel can be an optical fiber cable or a free-space link, for example. However, the photon transmission distance in such networks is limited by the loss in the quantum channels, wherein the current maximum distance in optical fibers without the use of trusted nodes lies in the region of approx. 200 km.

The disadvantage of quantum networks with the direct connection of the receivers to one another lies in the large technical and financial outlay for the many quantum channels required, the many sources and receivers.

The disadvantage of known quantum networks which connect several receivers via a source lies in the low transmission rate of the quantum communication when a large number of receivers are to be supplied with entangled photons for the quantum communication. In known quantum networks, entangled photon pairs are generated in the source in a broad frequency spectrum, wherein this broad frequency spectrum is split into several frequency bands in a frequency multiplexer. Each frequency band is assigned to one receiver. The wavelength of the entangled photon pairs generated is statistically distributed across the broad frequency spectrum of the source. Splitting the broad frequency spectrum into the individual frequency bands according to the number of receivers drastically reduces the transmission rate in the case of several receivers. The low transmission rate cannot be increased at will by increasing the generation of photon pairs in the source since this increases the probability of generating several uncorrelated photon pairs, which result in measuring errors at the receivers, at the same point in time.

SUMMARY OF THE INVENTION

The object of the present invention is to provide an improved, more cost-effective and more efficient method for quantum communication and a more efficient network system for quantum communication, in order to enable a quantum communication also over greater distances and between several receivers, in particular at a high transmission rate.

This object is achieved according to the invention by a method for quantum communication between several receivers in a network according to the features of claim 1.

Method for quantum communication, preferably for use for optical communication, quantum cryptography and/or quantum information science, between at least three receivers, preferably between i receivers where i=3 to n, comprising a source, a frequency multiplexer, the several receivers and a network of quantum channels, wherein the method comprises the following steps:

i) generating an entangled photon pair in the source with a signal photon and an idler photon, wherein the signal photon is generated in a signal wavelength range and the idler photon is generated in an idler wavelength range;

ii) assigning the signal and idler photons to the quantum channels in the frequency multiplexer on the basis of their wavelength;

iii) transmitting the photon pair to the receivers via the quantum channels;

iv) detecting the photon pair at the receivers for the quantum communication. According to the invention it is provided that the photons generated in step i) are generated in a signal wavelength range and an idler wavelength range that are spectrally separated from one another, and that, in step ii), the photons are assigned to the quantum channels such that, in step iii), only signal photons are transmitted to a first receiver for the communication with all other receivers, and, in step iii), only idler photons are transmitted to a second receiver for the communication with all other receivers, and, in step iii), both signal photons and idler photons are transmitted to the further receivers for the communication with all other receivers, and that all receivers are connected to the source via in each case one quantum channel.

Furthermore, the underlying object is achieved according to the invention by a network system for quantum communication.

According to the invention, a network system for quantum communication between several receivers is proposed, preferably with i receivers where i=3 to n, preferably for use for optical communication, quantum cryptography and/or quantum information science, wherein the network system has a source, a frequency multiplexer, a network of quantum channels and the several receivers, wherein the source generates entangled photon pairs with in each case one signal photon and one idler photon, and the signal photon has a wavelength in a signal wavelength range and the idler photon has a wavelength in an idler wavelength range, and wherein the frequency multiplexer assigns the signal and idler photons to the quantum channels on the basis of their wavelength, and wherein each receiver has a detection module with at least one detector for detecting the photons for the quantum communication. According to the invention it is provided that the signal wavelength range and the idler wavelength range are formed spectrally separated from one another, and that the network has one quantum channel between the source and each receiver for the transmission of the photons, and that the quantum channels are assigned to the frequency multiplexer such that only signal photons are transmitted to a first receiver for the communication with all other receivers, and only idler photons are transmitted to a second receiver for the communication with all other receivers, and both signal photons and idler photons are transmitted to the further receivers for the communication with all other receivers.

An advantage of the method and network according to the invention lies in the specific assignment of the photons to the quantum channels, because only signal photons are transmitted to the first receiver for the communication with all other receivers, and only idler photons are transmitted to the second receiver for the communication with all other receivers. This assignment is effected through the arrangement of the quantum channels relative to the frequency multiplexer and the splitting of the photons on the basis of their wavelength. Advantageously, this has the result that, for the first and the second receiver, the quantum channel and also the detection can be adapted to the corresponding wavelength range in order to enable a better communication rate or transmission rate, i.e. the communication rate or the transmission rate of the quantum communication is improved because the assignment of the photons is effected according to particular properties of the receivers, such as for example the distance or the detection.

A further advantage of the method and network according to the invention is the direct connection of the source to each receiver in each case by one quantum channel. As a result, the number of physical connections, i.e. of quantum channels, increases only via the relationship $n(n-1)/2$. In contrast to this, for a network with direct connection of the individual receivers to one another, a large number of additional quantum channels would be necessary.

It can advantageously be provided that, in step i), several photon pairs are generated one after another, which are then split onto the receivers, transmitted and detected one after another according to steps ii) to iv) in order to enable a quantum communication between the receivers with several photon pairs.

By further receivers is meant all receivers of the method or network system according to the invention which are not the first or the second receiver. For example, a network with four receivers has the first receiver, the second receiver and two further receivers. A network with, for example, six receivers has the first receiver, the second receiver and four further receivers.

It can be provided that steps i) to iv) are used for the generation of a common key pair for quantum cryptography, and/or for optical communication and/or for quantum information.

It can be provided that the signal wavelength range and the idler wavelength range are formed spectrally separated from one another by at least 50 nm, preferably by at least 100 nm, most preferably by at least 300 nm. The advantage of a spectral separation of the wavelengths of the signal and idler photons of this size is that, in step ii), the photons can be assigned to the quantum channels according to their wavelength without losses and using cost-effective and simple components. The assignment can thereby be effected without losses of the photons generated and purely such that a high communication rate between the receivers is guaranteed. Advantageously, this results in a cost-effective, lossless and simple splitting of the signal and idler photons onto the quantum channels in the frequency multiplexer. It is thereby also possible to use broadband, low-loss frequency multiplexers, as a result of which the transmission rate is further increased.

Preferably, by assigning the signal and idler photons to the quantum channels in the frequency multiplexer on the basis of their wavelength in step ii) is meant that the source generates signal and idler photons with different wavelengths and the photons are transmitted to the frequency multiplexer, preferably in a spatial mode. The frequency multiplexer splits the signal and idler photons onto different quantum channels according to their wavelength. It can be provided that the channels of the frequency multiplexer have a spectral width of between 0.1 nm and 5 nm. Through such a design, cost-effective components can be used. Due to the relatively large spectral width of the channels, the system also has only much lower losses through the assignment to the quantum channels.

It can be provided that the signal wavelength range is formed between 400 nm and 900 nm, preferably between 600 nm and 850 nm. The advantage of this range lies in the fact that silicon-based single-photon detectors can be utilized, which can be produced easily and cost-effectively and have a high detection efficiency in the range between 600 nm and 850 nm.

It can be provided that the idler wavelength range is formed between 950 nm and 2 μm, preferably between 1260 nm and 1360 nm (O band), and/or between 1360 nm and 1460 nm (E band), and/or between 1460 nm and 1530 nm (S band), and/or between 1530 nm and 1565 nm (C band), and/or between 1565 nm and 1625 nm (L band). An advantage of these wavelength ranges lies in the high transmission rate in optical fiber cables for transmitting the photons in a fiber, even over large distances.

From the spectrally separated signal and idler wavelength ranges described above, the further advantage results that a transfer or assignment of idler photons to receivers can be effected in a wavelength-dependent manner in order to compensate for losses due to distance. For example, the assignment can be effected such that only idler photons which, due to their wavelength, have a significantly lower loss during transmission in optical fibers are transferred to the most distant receivers. Furthermore, only signal photons which have a wavelength with higher losses in the optical fibers but have more cost-effective detectors or utilize detectors with higher detection efficiency can, for example, be transferred to the nearest or a near receiver. The advantage of this design lies in the simple and lossless splitting of the photons by the frequency multiplexer since a broad spectral spectrum is not being split here with high losses.

It can be provided that in each case two receivers of the photons of a photon pair form a communication pair, preferably where $k=i(i-1)/2$ communication pairs are formed in the case of i receivers. It can be provided that for each communication pair in each case one signal photon and one idler photon is generated in step i) in one specific partial wavelength range in each case, wherein each partial wavelength range for each communication pair is formed spectrally separated from the partial wavelength ranges of all other communication pairs. In the process, both the signal photons and the idler photons are generated further in the respective signal wavelength range and idler wavelength range. This means in particular that the signal wavelength range is divided into partial signal wavelength ranges according to the number of communication pairs, wherein the partial signal wavelength ranges are formed spectrally separated from one another. This applies analogously to the idler wavelength range, i.e. the idler wavelength range is divided into partial idler wavelength ranges according to the number of communication pairs, wherein the partial idler wavelength ranges are formed spectrally separated from one another. The advantage of this design lies in the simple and lossless splitting of the photons by the frequency multiplexer since a broad spectrum is not being split here with high losses, but rather the generation of the photon pairs is effected in an equally spectrally separated manner for each communication pair and as a result the splitting in the frequency multiplexer can be effected more cost-effectively, more easily and without large losses. The advantage of this design lies in the clear assignment of correlated photon pairs between the communicating communication pairs, while further photons, which are not part of the respective partial wavelength range, are recognized as uncorrelated photons and thus as noise or do not degrade the signal due to filtering, as a result of which the error rate (Quantum Bit Error Rate QBER) is significantly reduced by the advantage of the inventions.

It can be provided that the spectral width of the signal and idler photons is smaller than 5 nm, preferably is smaller than 2 nm, most preferably is smaller than 0.1 nm. It can be provided that the spectral width of the signal and idler photons is smaller than or equal to the spectral width of the frequency multiplexer.

It can be provided that the partial signal wavelength ranges are spectrally separated such that at most 5%, preferably at most 1%, most preferably 0.01%, of the wavelength spectrum of two signal photons overlaps. It can be provided that the partial idler wavelength ranges are spectrally separated such that at most 5%, preferably at most 1%, most preferably 0.01%, of the wavelength spectrum of two idler photons overlaps. The advantage of such a small overlapping consists of a higher density of the partial signal wavelength ranges, wherein the overlap is kept small such that the losses forming as a result during the assignment do not significantly affect the high communication rate.

It can be provided that the partial signal wavelength ranges and/or the partial idler wavelength ranges of different communication pairs are formed spectrally separated from one another by at least one times the spectral width (full width at half maximum or bandwidth), preferably at least double the spectral width (full width at half maximum or bandwidth), most preferably at least more than four times the spectral width (full width at half maximum or bandwidth), of the signal and/or idler photons. An advantage of a larger separation of the individual pair signal wavelengths and/or pair idler wavelengths for different communication pairs lies in the fact that the signal and/or idler photons of the different communication pairs can be split much more precisely and without losses by the frequency multiplexer.

It can be provided that, for simultaneous quantum communication, the source is formed between several communication pairs, because in step i) in each case one photon pair is generated simultaneously for two or more communication pairs. The advantage of this design according to the invention lies in the simultaneous high transmission rate between several communication pairs. As a result, in the case of quantum communication the transmission rate is not reduced according to the number of communication pairs as in the case of known sources, but rather it enables a high transmission rate even simultaneously between several communication pairs. The simultaneous generation of several photon pairs for several communication pairs in combination with the spectral division of the signal and idler wavelength ranges into the partial wavelength ranges for the different communication pairs is particularly advantageous. The advantage lies in the fact that several communication pairs can communicate simultaneously with a high transmission rate and the assignment and splitting in the frequency multiplexer is effected almost losslessly, since the wavelengths of the signal and idler photons of a pair, the signal photons of several communication pairs and the idler photons of several communication pairs are formed spectrally separated from one another.

It can be provided that, for the simultaneous quantum communication, in step ii), the photons are assigned to the quantum channels such that, in step iii), only signal photons are transmitted to a first receiver for the communication with all other receivers, and, in step iii), only idler photons are transmitted to a second receiver for the communication with all other receivers, and, in step iii), both signal photons and idler photons are transmitted to the further receivers for the communication with all other receivers. It is possible that, for the simultaneous quantum communication, photons are transferred to two communication pairs or three communication pairs or several communication pairs or all communication pairs.

It can be provided that, for the simultaneous quantum communication, in step ii), several signal and/or idler photons for a receiver can be assigned to a quantum channel of the receiver on the basis of their wavelength, and that, in step iii), the several signal and/or idler photons for a receiver are transmitted to the receiver in a quantum channel, and, in step iv), the several signal and/or idler photons are detected at a receiver. The advantage consists of the fact that, for the simultaneous quantum communication with several receivers, several quantum channels are not required, but rather the transmission is effected via the in each case one quantum channel between source and receiver.

Here, simultaneously means that two or more entangled photon pairs are generated within the measurement time of a photon in a detector, preferably in the slowest detector of the system, wherein here the measurement time comprises the detection of the photon and the dead time of the detector, wherein the generation takes place in the source. By dead time of the detector is meant the time which a detector requires in order to return to its initial electrical state after a detection of a photon in order to detect a subsequent photon.

It can be provided that a transmission rate of at least 1 kHz, preferably at least 100 kHz, most preferably at least 10 MHz, is performed simultaneously between two or more communication pairs.

It can be provided that one or more or all quantum channels are formed as optical fiber channels and/or have optical fiber sections. The advantage of such a design lies in the cost-effective and simple structure of the network.

It can be provided that the quantum channel has one optical fiber, or two optical fibers or several optical fibers between the source and the further receivers, wherein in the case of two or more optical fibers these are preferably optimized for different wavelength ranges, preferably for the signal wavelength range and/or the idler wavelength range. The advantage of the quantum channel with only one optical fiber lies in the cost-effective and simple structure. The advantage of the quantum channel with two or more optical fibers lies in the fact that the optical fiber with the lowest losses or interference can be chosen for transmitting the photon to the receiver.

It can be provided that one or more quantum channels are formed as a non-routed quantum channel, preferably that the transmission is effected through the air, or vacuum or a liquid. The advantage of such a quantum channel is the low losses during the transmission. The receiver of a non-routed quantum channel is preferably arranged in a satellite.

It can be provided that the first receiver is arranged at most 20 km, preferably at most 10 km, most preferably at most 2 km, away from the source, or is arranged in close proximity to the source. The advantage of this design lies in the fact that cost-effective detectors with high efficiency can be utilized for the detection of the signal photons in this wavelength range, wherein the arrangement close to the source ensures that the loss in the quantum channels does not outweigh the advantage of the high detection efficiency. Furthermore, with a close arrangement it is also possible to use cost-effective quantum channels, preferably cost-effective fibers, since the losses are also not as serious in the case of a short transmission path.

It can be provided that the second receiver, which receives only idler photons, is connected to the source via an optical fiber, preferably that the optical fiber has a length of more than 20 km, most preferably at least 50 km or at least 100 km. The advantage of the method and system according to the invention lies in the fact that a high transmission rate to a distant receiver can be ensured also in the case of a communication between several receivers, because it only obtains idler photons, which have a wavelength in the idler wavelength range.

It can be provided that the source generates entangled photon pairs through a nonlinear process, preferably through down conversion, or spontaneous parametric down conversion, or four-wave mixing.

It can be provided that the entangled photon pairs are entangled in terms of time, and/or polarization, and/or orbital angular momentum, and/or spin angular momentum.

It can be provided that the receiver has a detection module with at least one detector or with several detectors.

It can be provided that the one detector or the several detectors are formed as single-photon detectors, preferably as germanium or silicon detectors, or single-photon avalanche diodes or indium gallium arsenide detectors, or superconducting nanowire single-photon detectors, or silicon avalanche photodiodes.

It can be provided that, for determining the entanglement property, the detection module has a measuring module, preferably a polarizer, and/or an asymmetrical interferometer, and/or a Spatial Light Modulator (SLM).

It can be provided that the receiver has several detection modules with in each case at least one detector or with several detectors for the communication, wherein each detection module is formed for communication with one receiver. As a result, the receiver can communicate with several other receivers simultaneously. It can be provided that frequency filters are arranged in front of the several detection modules, in order to enable a communication with several receivers simultaneously, because the photons are split onto the detection modules on the basis of their wavelength. As a result, one detection module can be assigned to each receiver in the network.

It can be provided that the frequency filter is formed as a dichroic mirror, or as a grating, or as a filter.

It can be provided that two or more network systems according to the invention are connected to one another via a receiver, because the two network systems share this receiver. For the communication between the network systems, a Bell state measurement, swapping or quantum teleportation is preferably carried out across this receiver. The receiver via which two network systems are connected is preferably the first receiver or the second receiver. The advantage of such a design lies in the fact that the advantages of the network system according to the invention can be increased even beyond the distance and range of a network system.

BRIEF DESCRIPTION OF THE DRAWINGS

Further embodiments of the invention are represented in the figures and described in the following. In the figures, a possible design of the invention is shown by way of example. This design serves to explain a possible implementation of the invention and is not to be understood to be limitative. There are shown in.

DETAILED DESCRIPTION

Figure 1:
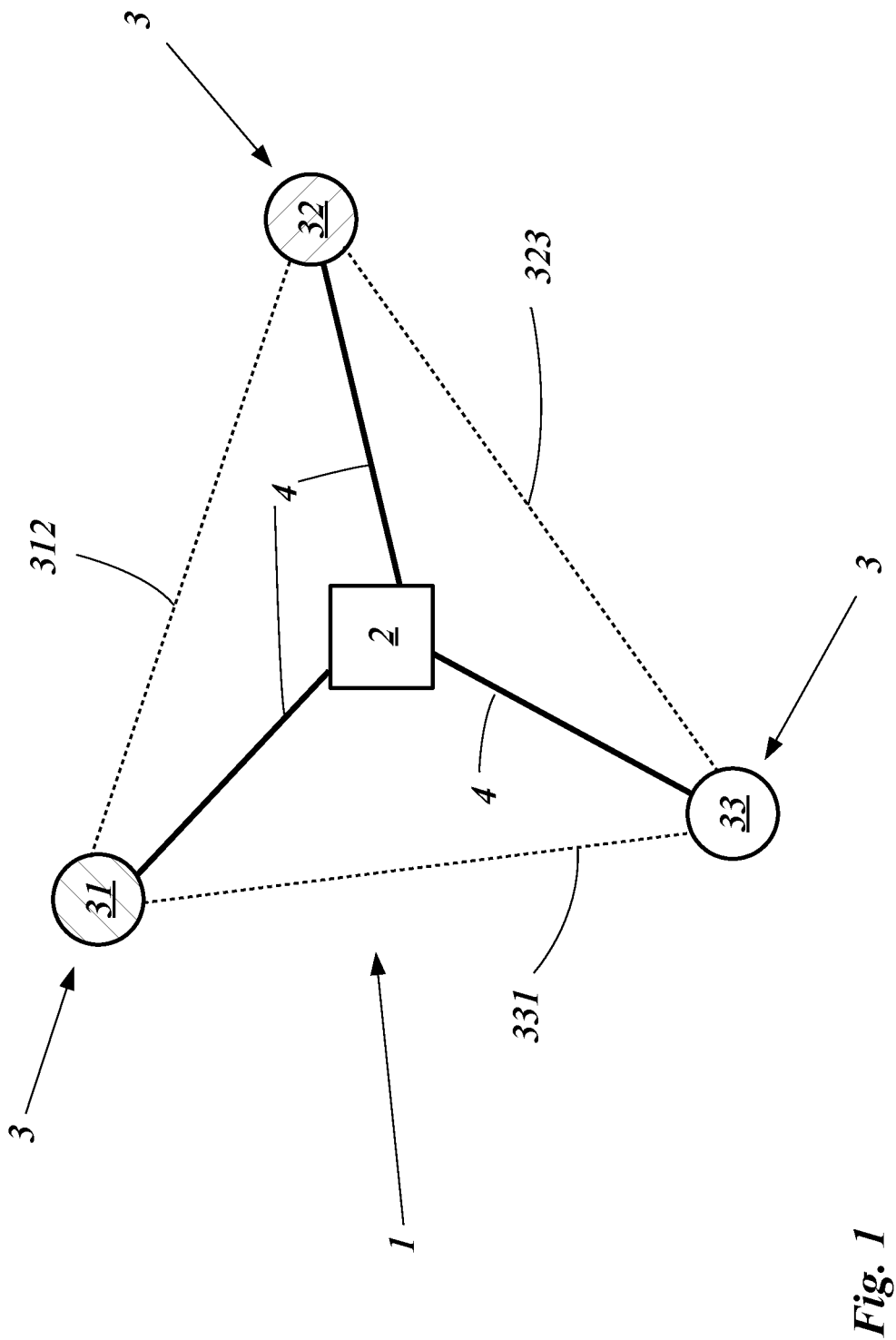
FIG. 1: a schematic representation of the network system according to the invention with three receivers.

FIG. 1 shows a schematic representation of the network system 1 according to the invention, with a source 2, three receivers 3, which are connected to the source 2 via in each case one quantum channel 4.

The network system 1 connects the source 2 to each receiver 3 via in each case one quantum channel 4. In the source 2, entangled photon pairs are generated with in each case one signal photon and one idler photon. For the communication between two receivers 3 the signal photon and the idler photon of a pair are transmitted to in each case one receiver 3 through the respective quantum channels 4.

The source 2 has a frequency multiplexer, which assigns the photons generated in the source 2 to the quantum channels 4 of the receivers 3 on the basis of their wavelength. In the process, the assignment is effected such that a first receiver 31 obtains only signal photons, irrespective of the further receiver 3 with which it communicates. Furthermore, the assignment is effected such that a second receiver 32 obtains only idler photons, irrespective of the further receiver 3 with which it communicates. The further (third) receiver 33 in FIG. 1 at one time obtains idler photons when it communicates with the first receiver 31 and obtains signal photons when it communicates with the second receiver 32.

In the process, the two receivers 3, which share the photons of a pair, in each case form a communication pair; in the example of FIG. 1, the first receiver 31 and the second receiver 32 form a first communication pair 312, the second receiver 32 and the further (third) receiver 33 form a second communication pair 323 and the further (third) receiver 33 and the first receiver 21 form a third communication pair 331.

Figure 3:
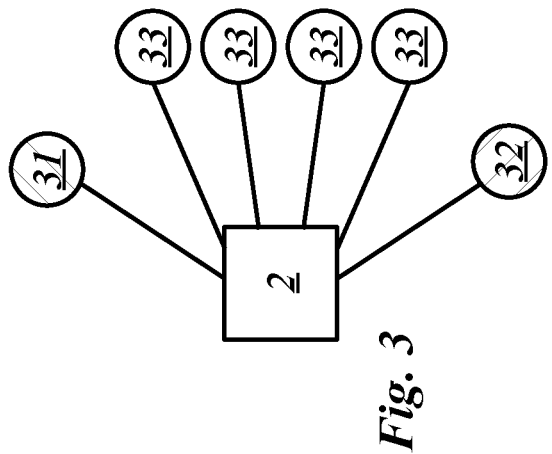
FIG. 3: a schematic representation of the network system according to the invention with six receivers.
Figure 2:
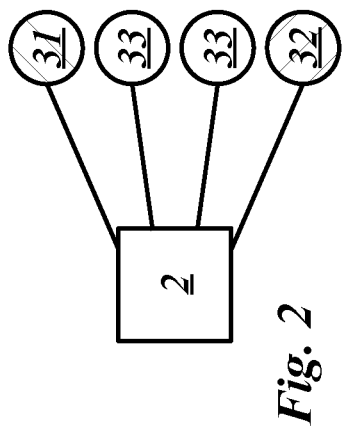
FIG. 2: a schematic representation of the network system according to the invention with four receivers.

The embodiment examples of FIGS. 2 and 3 show two network systems 1 according to the invention with four receivers 3 (FIG. 2) and with six receivers 3 (FIG. 3). As also in the network system 1 according to the invention in FIG. 1, both network systems 1 have in each case a first receiver 31, a second receiver 32 and several further receivers 33, wherein two further receivers 33 are formed in FIG. 2 and four further receivers 33 are formed in FIG. 3. The assignment of the photons to the receivers 3 in FIGS. 2 and 3 is effected analogously to the embodiment example of FIG. 1, because the first receiver 31 obtains only signal photons, irrespective of the further receivers 3 with which it communicates. Furthermore, the assignment is effected such that the second receiver 32 obtains only idler photons, irrespective of the further receivers 3 with which it communicates. The further (third) receivers 33 in FIGS. 2 and 3 obtain idler photons or signal photons depending on the receiver 3 with which they communicate.

Figure 4:
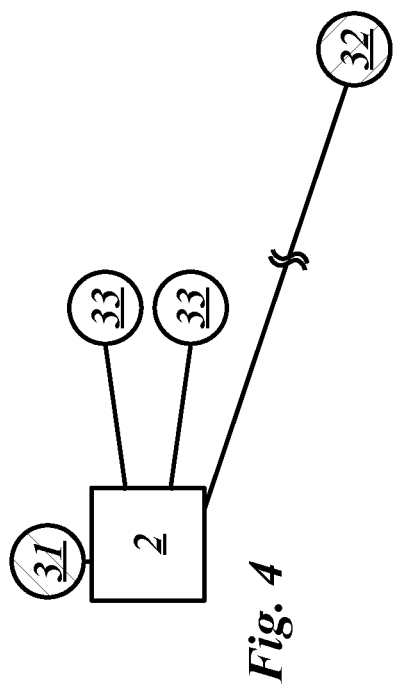
FIG. 4: network system from FIG. 2 with a specific arrangement of the first and second receivers.

FIG. 4 shows a network system 1 according to the invention as a schematic representation, wherein the first receiver 31 is arranged spatially near to the source 2 and the second receiver 32 is arranged spatially far away from the source 2. As a result, the advantages of the splitting onto the quantum channels 4 and of the specific generation of the photons in the signal and idler wavelength range become apparent, because, depending on the wavelength of the photons, cost-effective detectors with high detection efficiency can be utilized for the first receiver 31 and a low loss in the transmission is enabled for the second receiver 32 even in the case of a longer distance.

Figure 5:
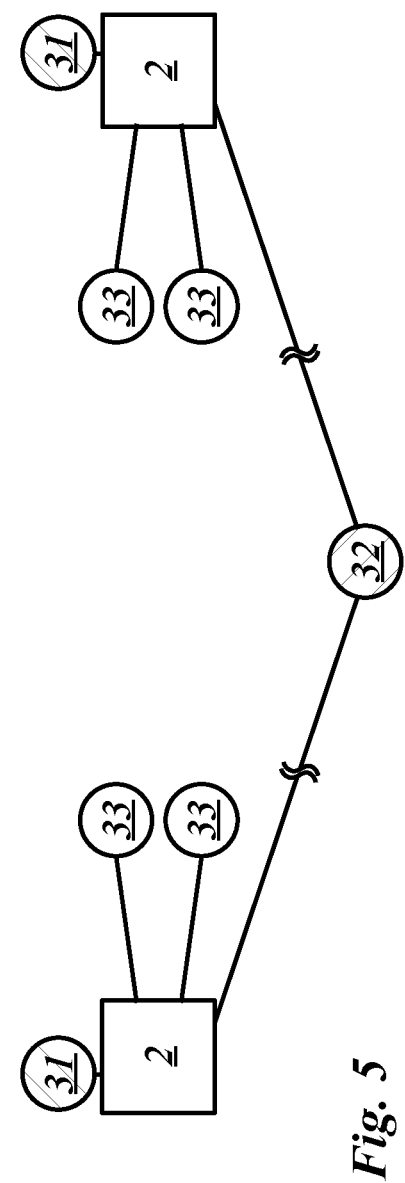
FIG. 5: two network systems according to the invention, which are connected to one another via a second receiver.
Figure 6:
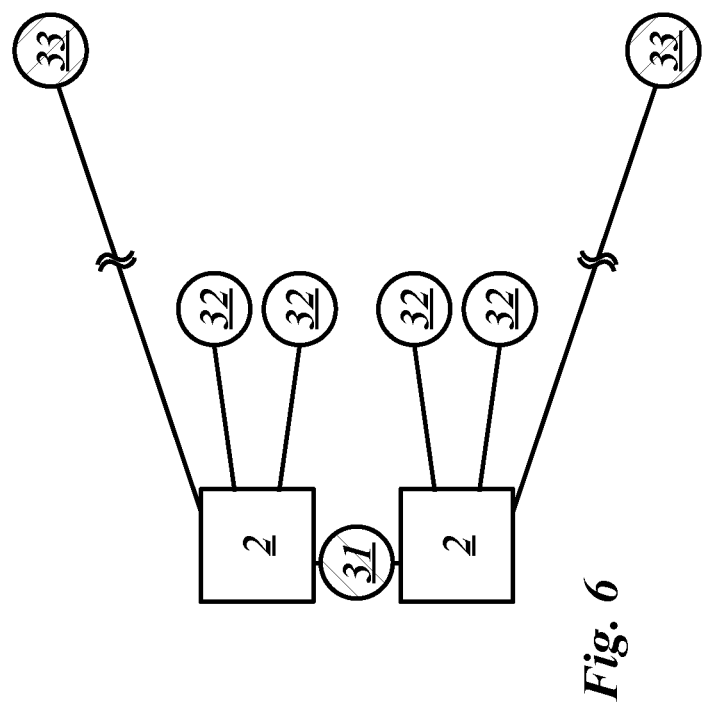
FIG. 6: two network systems according to the invention, which are connected to one another via a first receiver.

FIGS. 5 and 6 in each case show two network systems 1 according to the invention, which share at one time the first receiver 31 (FIG. 6) and at one time the second receiver 32 (FIG. 5). This means that the shared receiver 31 and 32 is connected to each source 2 in each case with one quantum channel 4. Now, for the communication between the network systems 1, a Bell state measurement, swapping or quantum teleportation can be carried out across the first receiver 31 (FIG. 6) or the second receiver 32 (FIG. 5), wherein at the same time the advantages of the network system 1 according to the invention are retained.

LIST OF REFERENCE NUMBERS 1 network system
2 source
3 receiver
31 first receiver
32 second receiver
33 further receiver
312 first communication pair
323 second communication pair
331 third communication pair
4 quantum channel

What is claimed is:

1. A method for quantum communication between at least three receivers in a network system, the network system comprising a source, a frequency multiplexer, the at least three receivers and a network of quantum channels, wherein the method comprises the following steps:
  i) generating an entangled photon pair in the source with a signal photon and an idler photon, wherein the signal photon is generated in a signal wavelength range and the idler photon is generated in an idler wavelength range;
  ii) assigning the signal and idler photons to the quantum channels in the frequency multiplexer on the basis of their wavelength;
  iii) transmitting the photon pair to the receivers via the quantum channels;
  iv) detecting the photon pair at the receivers for the quantum communication,
  wherein the photons generated in step i) are generated in a signal wavelength range and an idler wavelength range that are spectrally separated from one another, and
  wherein, in step ii), the photons are assigned to the quantum channels such that, in step iii), only signal photons are transmitted to a first receiver for the communication with all other receivers, and, in step iii), only idler photons are transmitted to a second receiver for the communication with all other receivers, and, in step iii), both signal photons and idler photons are transmitted to the further receivers for the communication with all other receivers, and wherein all receivers are connected to the source via in each case one quantum channel.

2. The method for quantum communication according to claim 1, wherein the signal wavelength range and the idler wavelength range are formed spectrally separated from one another by at least 50 nm.

3. The method for quantum communication according to claim 1, wherein the signal wavelength range is formed between 400 nm and 900 nm.

4. The method for quantum communication according to claim 1, wherein the idler wavelength range is formed between 950 nm and 2 µm (O band), and/or between 1360 nm and 1460 nm (E band), and/or between 1460 nm and 1530 nm (S band), and/or between 1530 nm and 1565 nm (C band), and/or between 1565 nm and 1625 nm (L band).

5. The method for quantum communication according to claim 1, wherein the spectral width of the signal and idler photons is smaller than 5 nm.

6. The method for quantum communication according to claim 1, wherein, in each case, two receivers of the photons of a photon pair form a communication pair, wherein each partial wavelength range for each communication pair is formed spectrally separated from the partial wavelength ranges of all other communication pairs.

7. The method for quantum communication according to claim 6, wherein the partial signal wavelength ranges are spectrally separated such that at most 5% of the wavelength spectrum of two signal photons overlaps, and/or wherein the partial idler wavelength ranges are spectrally separated such that at most 5% of the wavelength spectrum of two idler photons overlaps.

8. The method for quantum communication according to claim 6, wherein the source is formed for simultaneous quantum communication between several communication pairs, because in step i) in each case one photon pair is generated simultaneously for two or more communication pairs.

9. The method for quantum communication according to claim 8, wherein, for simultaneous quantum communication, in step ii), the photons are assigned to the quantum channels such that, in step iii), only signal photons are transmitted to a first receiver for the communication with all other receivers, and, in step iii), only idler photons are transmitted to a second receiver for the communication with all other receivers, and, in step iii), both signal photons and idler photons are transmitted to the further receivers for the communication with all other receivers.

10. The method for quantum communication according to claim 6, wherein a transmission rate of at least 1 kHz is performed simultaneously between two or more communication pairs.

11. The method for quantum communication according to claim 1, wherein the first receiver, which receives only signal photons, is arranged at most 20 km away from the source, or is arranged in close proximity to the source, and/or wherein the second receiver, which receives only idler photons, is connected to the source via an optical fiber.

12. The method for quantum communication according to claim 1, wherein the receiver has a detection module with at least one detector or with several detectors, and/or wherein the receiver has several detection modules with in each case at least one detector or with several detectors for the communication, wherein each detection module is formed for communication with one receiver.

13. The method for quantum communication according to claim 1, wherein two or more network systems are connected to one another via a receiver, because the two network systems share this receiver, because, for the communication between the network systems, a Bell state measurement, swapping or quantum teleportation is carried out across this receiver; the receiver via which the two network systems are connected.

14. A network system for quantum communication between several receivers,
- wherein the network system has a source, a frequency multiplexer, a network of quantum channels and the several receivers,
- wherein the source generates entangled photon pairs with in each case one signal photon and one idler photon, and the signal photon has a wavelength in a signal wavelength range and the idler photon has a wavelength in an idler wavelength range, and
- wherein the frequency multiplexer assigns the signal and idler photons to the quantum channels on the basis of their wavelength, and
- wherein each receiver has a detection module with at least one detector for detecting the photons for the quantum communication, and
- wherein the signal wavelength range and the idler wavelength range are formed spectrally separated from one another, and
- wherein the network has one quantum channel between the source and each receiver for the transmission of the photons, and
- wherein the quantum channels are assigned to the frequency multiplexer such that only signal photons are transmitted to a first receiver for the communication with all other receivers, and only idler photons are transmitted to a second receiver for the communication with all other receivers, and both signal photons and idler photons are transmitted to the further receivers for the communication with all other receivers.

15. The network system according to claim 14, wherein two or more network systems according to the invention are connected to one another via a receiver, because the two network systems share this receiver.

* * * * *